Jan. 19, 1932.   G. W. PICKARD   1,841,628
ELECTRICAL CONDENSER
Filed Nov. 23, 1927   2 Sheets-Sheet 1
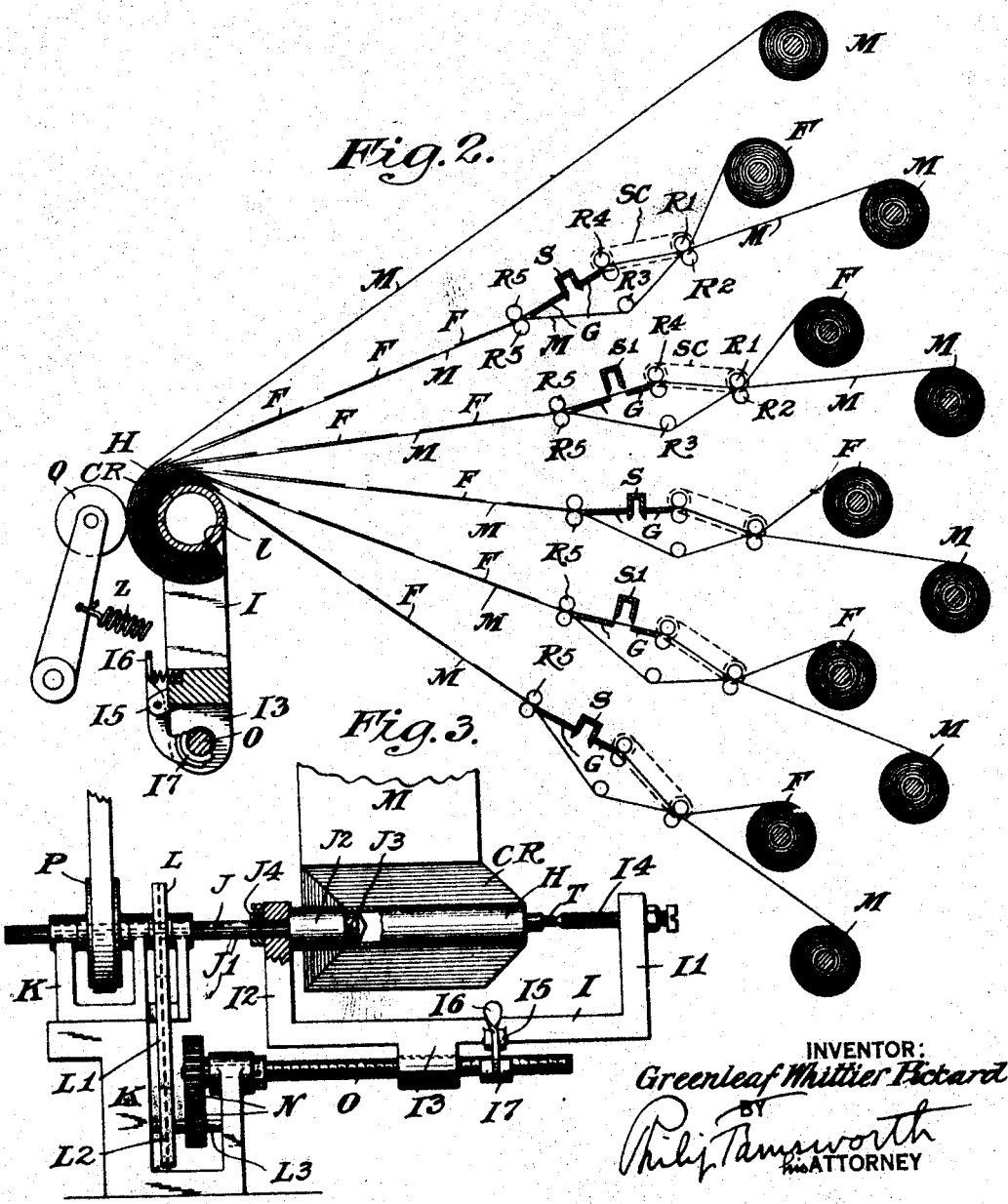
INVENTOR:
Greenleaf Whittier Pickard
BY
Philip Farnsworth
his ATTORNEY Jan. 19, 1932.  G. W. PICKARD  1,841,628
ELECTRICAL CONDENSER
Filed Nov. 23, 1927     2 Sheets-Sheet 2
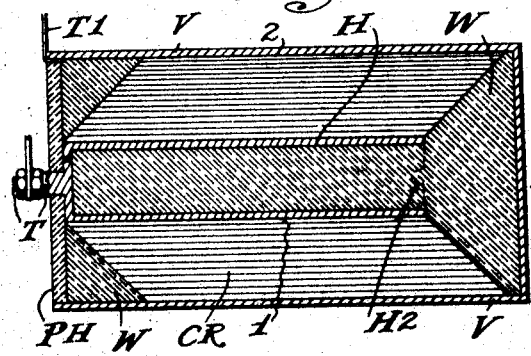
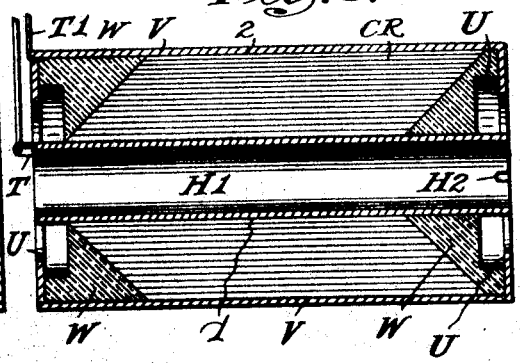
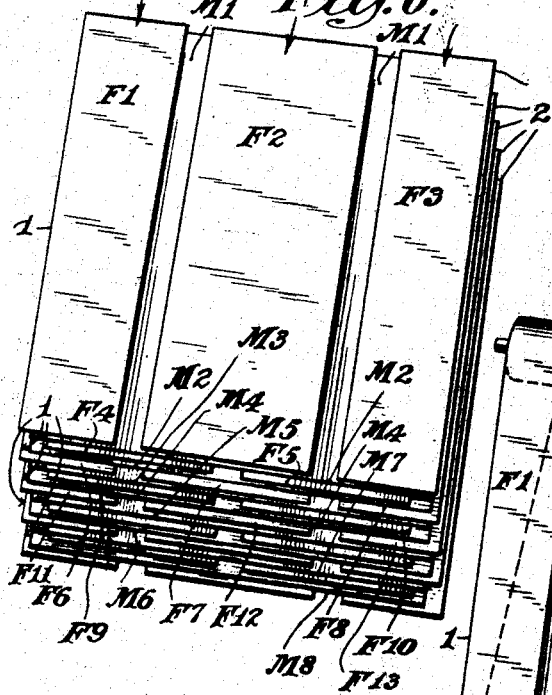
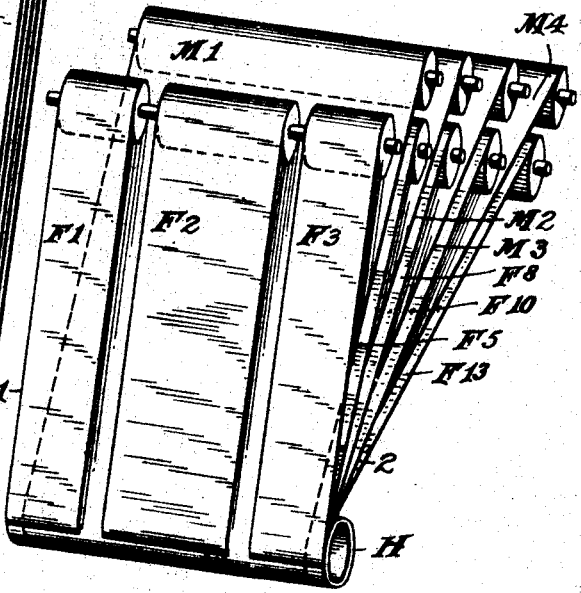
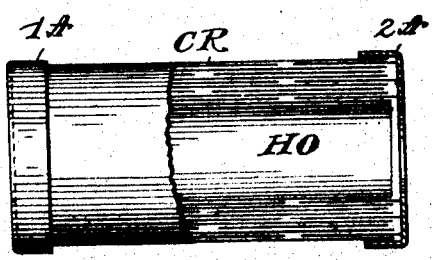
INVENTOR:
Greenleaf Whittier Pickard
BY
Philip Farnsworth
his ATTORNEY.

Patented Jan. 19, 1932

1,841,628

UNITED STATES PATENT OFFICE

GREENLEAF WHITTIER PICKARD, OF NEWTON CENTER, MASSACHUSETTS, ASSIGNOR, BY MESNE ASSIGNMENTS, TO GENERAL ELECTRIC COMPANY, A CORPORATION OF NEW YORK

ELECTRICAL CONDENSER

Application filed November 23, 1927. Serial No. 235,134.

The invention relates in general to electric condensers, and more particularly to series section type electric condensers and to methods and apparatus for making the same.

One method embodying the invention may comprise unrolling a plurality of single strip rolls of dielectric and foil alternately disposed and then rolling the alternate layers of foil and dielectric upon a suitable mandrel tube in a suitable rolling machine. Before rolling on the mandrel the foil layers may be cut to form spaced plates, adjacent foil layers having their plates staggered to provide the proper relation therebetween. The mandrel may be made of metal and the inner end plates may be connected thereto for one terminal of the condenser. A metal tube may be provided around the finished roll and the outer end plates of the condenser connected thereto for the other terminal of the condenser. If desired, the layers may be rolled slightly helically to form a condenser roll having conical ends to increase the distance between terminals. Suitable insulation may be placed at the ends and in the inner and outer tubes, or, if desired, the mandrel tube may be left unfilled to provide a cooling opening through the condenser.

Another method of practicing the invention may comprise providing alternate layers of foil and dielectric, each foil layer comprising a plurality of foil strips laid side by side in spaced relation. Adjacent foil layers have the spacings between strips staggered to provide the proper relation between condenser plates. The stack of alternate layers of foil and dielectric may be wound in the direction of the length of the foil strips upon a suitable mandrel into a roll condenser and caps may be provided on opposite ends of the roll to which the end plates may be connected to provide terminals on opposite ends. If desired, the condenser may be mounted in clips engaging the caps on opposite ends in a manner similar to the mounting of the ordinary cartridge fuse.

One type of mechanism for performing the methods of the invention may comprise suitable winding apparatus for rolling the layers of dielectric and foil into a roll and suitable cutting devices to form the separate plates, if necessary. Suitable devices may be provided for shifting the roll axially, as it is being wound, to provide the conical ends on the condenser as above described.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 represents, diagrammatically, a development of a series section condenser;

Fig. 2 is a diagrammatic representation of one form of apparatus which may be used for making the condenser;

Fig. 3 is a detail of the winding mechanism;

Fig. 4 is a longitudinal section through one form of finished condenser;

Fig. 5 is a longitudinal section through another form of finished condenser;

Fig. 6 illustrates a modified form of condenser and a modified method of making it;

Fig. 7 represents diagrammatically apparatus for performing the modified method; and Fig. 8 is an elevation partly in section of a condenser made by the modified method illustrated in Figs. 6 and 7.

In the following description and in the claims parts will be identified by specific names for convenience, but they are intended to be as generic in their application to similar parts as the art will permit.

Like reference characters denote like parts in the several figures of the drawings.

Referring more particularly to Fig. 1, the condenser shown is made up of a plurality of sections A, B, C, D, E, F, G and H. The condenser is formed by alternate layers of dielectric having interposed foil plates 3, 4, 5, 6, 7, 8, 9, 10, etc., the plates being disposed as shown. The end plates 3, 4 and 5 are connected together by a common conductor 1; similarly the end plates on the other end are connected together by a common conductor 2. It will be seen that each section B, C, etc., comprises one-half of alternate condenser plates 8, 9 and 10 and one-half of the area of the interposed condenser plates 6 and 7. The disposition of the plates or floating relation automatically places the sections in series relation.

In order to make the condenser shown in Fig. 1, a condenser rolling machine is provided made up of a suitable framework K. A shaft J having a spline J1 is journalled in arms of the frame K. A drive pulley P having a driving belt has feather keyway engagement with the shaft J and is mounted between arms of the frame K. Similarly a sprocket wheel L having feather keyway engagement with the shaft J is mounted between arms of framework K.

A second sprocket L2 is mounted on shaft L3 journalled in the frame K and is driven by a chain L1 riding on both sprockets L and L2. A drive screw O is journalled in the frame K and is driven by the sprocket L2 through suitable gears N.

A suitable yoke I is provided having arms I1 and I2. The shaft J extends through the arm I2 and has a drum J2 mounted on the end thereof. A collar J4 holds the arm I2 between it and the drum J2. The arm I1 has a tail stock I4 mounted therein. A mandrel H which is to form the inside terminal of the finished condenser and having a binding post T, is mounted between the tail stock I4 and the drum J2, the drum J2 having projections J3 for engaging in slots H2 (Fig. 4) to drive the mandrel H. The yoke I has a sleeve I3 slidably mounted on the screw O and a pair of ears I5 between which is mounted a nut member I6 having a threaded nut portion I7 adapted to engage the screw O.

It will be seen that, as the drive pulley P drives the shaft J, the mandrel H will rotate and at the same time the screw O will cause the yoke I to move axially of the frame K pulling both the spline shaft J and mandrel H therewith.

To make the condenser shown in Fig. 4 alternate rolls of dielectric M are disposed as shown in Fig. 2. Between the rolls M are mounted rolls of foil F. The strips on all rolls are led to the mandrel where the ends of the foil F are conductively secured together and conductively secured to the mandrel H by conductor 1.

In order to cut the foil into plates, suitable cutting mechanisms made up of cutting members S or S1 and plate members G are provided in the path of each of the foil layers. Suitable guide rolls R1 and R2 are provided for combining a layer of dielectric with a layer of foil and suitable rolls R3 are provided to guide the dielectric away from the cutting mechanisms S, G and S1, G. Suitable rolls R5 are provided for combining the dielectric and metal layers after the latter have been cut. Suitable rolls R4 are provided for guiding the foil on the cutting mechanism, these rollers being driven by chain SC from the rolls R1 which in turn are driven by the pull of the dielectric strip. It will be seen that alternate knives S and S1 cut their respective foil strips alternately to provide the alternate spacings between plates in the different layers of foil. As shown in Fig. 2 of the drawings the knives S and S' are located substantially equi-distantly from the winding mandrel so that it will be apparent that these knives must be timed differently in order that the alternate foils have the staggered relationship called for. This is why the knives S are all shown in one part in their travel, while the knives S' are shown in a different part of their travel. Any customary mechanism for attaining the desired timing of the knives may be used, and the specific mechanism to accomplish this purpose constitutes no part of this invention.

A suitable pressure wheel Q is journalled at the end of a pressure arm, a spring Z being provided for holding the pressure wheel against the condenser as it is being rolled on the mandrel, to aid in winding the condenser very tightly, thereby preventing displacing a dielectric medium in series with the foil layers.

After the condenser is wound, an outer metal casing V may be slipped over the roll, the outer ends of the foil layers being connected to the casing V by conductor 2. If desired, suitable insulation such as paraffin or asphaltum W may be provided to fill the entire casing V, an insulating cover P being provided to close the casing. It will be seen that one terminal T is secured to the mandrel H and the other terminal T1 is secured to the casing V.

If desired in the process illustrated in Figs. 2 and 3, a mandrel having the form H1 as shown in Fig. 5 may be used to make a slightly modified form of condenser. In this form, the mandrel is left hollow to secure better cooling action. The casing V in this modification has its ends bent inwardly to form arc gaps with the mandrel H1. The casing V is connected to the outside end plates by conductor 2 and the mandrel H1 is connected to the inside end plates by conductor 1 as in Fig. 4. Suitable insulation W may be provided at the ends of the condenser to seal the edges of the alternate layers. The arc gaps protect the condenser from abnormally high voltage, the voltage jumping across the gaps rather than puncturing the condenser.

The voltage the condensers shown in Figs.

4 and 5 can withstand depends upon the number of sections A, B, C, etc. The capacity depends upon the plate area, which in turn depends upon the number of foil layers which determine the plates to a section and the size plate. The size plate may be regulated by changing the width of the foil strip or the length of the plate between cuts. It is preferable that the desired plate area be obtained by increasing the number of plates or by increasing the width of the strip rather than the lengths between cuts in order to minimize the internal resistance of the condenser.

To practice the method illustrated in Figs. 6 and 7 and to make the product illustrated in Fig. 8, a plurality of rolls of foil and dielectric may be alternately disposed as illustrated in Fig. 7. Each foil roll may comprise a plurality of strips or sections F1, F2 and F3 in one layer, F4, and F5 in the next foil layer, F6, F7 and F8 in the next foil layer, F9 and F10 in the next foil layer, etc. The strips are placed side by side and spaced as illustrated, the spacings in adjacent foil layers being staggered to provide the desired condenser action and series section relation. The relation of the dielectric layers M1, M2, M3, etc., and foil layer before winding is illustrated in Fig. 6, the arrows indicating the direction in which the stack of layers is wound.

A suitable mandrel H may be provided shown in Fig. 7 and the stack wound on a machine similar to that illustrated in Figs. 2 and 3, except that no axial shaft nor any cutting devices is necessary.

After the stack is wound tightly into a roll, the end plates F3, F6, etc., of alternate foil layers are connected at 2 and soldered or otherwise electrically connected to ring cap 2A. Similarly the end plates of the same foil layers F1, F5, etc., are connected together as at 1, and electrically connected to another ring cap 1A. If desired, the mandrel H may be removed, leaving an opening HO. Ring caps 1A and 2A having openings aligned with the opening HO provide for ample cooling.

It will be noted that the product made by this method is similar in appearance to an ordinary cartridge fuse and may be mounted in clips (not shown) engaging the caps 1A and 2A with all the ease and facility in the case of the ordinary cartridge fuse.

The desired voltage is provided for by the number of sections or strips F1, F2, F3, etc., laid side by side. The capacity is provided for by making the strips of sufficient area either by changing the length or the width. For high voltages the roll condenser shown in Fig. 8 may be very long and of comparatively small diameter and may appear very similar to an ordinary household shade roller. It is desirable that the area of the plates be increased by providing a larger number or by making them longer rather than wider in order to minimize the internal resistance of the condenser.

Thus condensers have been disclosed which are rugged and compact and can be made of any desired capacity and to withstand any voltage. The methods employed may be used to make condensers having the above properties very quickly and inexpensively and lends itself to mass production. The apparatus used is simple and rugged in construction and may be used to aid in performing the above methods to great advantage.

While certain novel features of the invention have been shown and described and are pointed out in the annexed claims, it will be understood that various omissions, substitutions and changes in the forms and details of the invention as illustrated may be made by those skilled in the art without departing from the spirit of the invention.

What is claimed is:

1. Apparatus for making condensers comprising alternately disposed supply rolls for dielectric and conducting layers, a cutting device for each conducting layer, alternate cutting devices being arranged to make staggered cuts, a winding mechanism including a mandrel holder, and means for simultaneously rotating and shifting axially said mandrel holder.

2. Apparatus for making condensers comprising alternately disposed supply rolls for dielectric and conducting layers, a cutting device for each conducting layer, alternate cutting devices being arranged to make staggered cuts, a winding mechanism including a mandrel holder, and means for rotating said mandrel holder.

3. Apparatus for making condensers comprising a source of dielectric and conducting layers, a cutting device for each conducting layer, means for feeding said conducting layer, means for feeding said conducting layers through said cutting devices and said dielectric layers around said cutting devices, means for causing said dielectric layers to carry the plates into which the conducting layers are cut, and means for winding said layers into a roll.

4. Winding mechanism comprising a framework, a splined shaft journalled in said framework and having a head stock secured thereto, a yoke loosely placed on said shaft and held in fixed axial relation to said head stock, said yoke carrying a tail stock, said head stock and tail stock being adapted to center a mandrel, a drive pulley and sprocket fixedly journalled in said framework on said shaft, a second sprocket journalled in said frame, a chain on said sprockets, a drive screw journalled in said frame, gearing connecting said second sprocket and drive screw, a sleeve on said yoke surrounding said drive screw and a spring pressed threaded member mounted on said yoke and yieldably held against one side of said screw.

5. Winding mechanism comprising a framework, a splined shaft journalled in said framework and having a head stock secured thereto, a yoke loosely placed on said shaft and held in fixed axial relation to said head stock, said yoke carrying a tail stock, said head stock and tail stock being adapted to center a mandrel, a drive wheel and fixedly journalled in said framework on said shaft, a drive screw journalled in said frame, gearing connecting said shaft and drive screw, and thread means on said yoke engaging said drive screw.

6. Condenser machine for making a roll condenser comprising centers, a mandrel on which the condenser is wound supported by said centers, means for rotating said mandrel, a feed device for feeding layers of condenser material to said mandrel, and means for relatively axially shifting said mandrel and feed device as the condenser is rolled on said mandrel.

7. A machine for making roll paper condensers of dielectric and foil strips comprising a winding mandrel, driving mechanism for the mandrel, and means for relatively shifting the mandrel with respect to the dielectric and foil strips in timed relation to said driving mechanism to produce a substantially tapered end portion to a condenser when wound.

8. A machine for making roll paper condensers of dielectric and foil strips comprising a winding mandrel, driving mechanism for the mandrel, and means for supplying dielectric and foil members to said mandrel in such manner that the foil members are staggered circumferentially with respect to the foil members in alternate layers.

9. A machine for making roll paper condensers of dielectric and foil strips comprising a winding mandrel, driving mechanism for the mandrel, and means for supplying alternate foil members to the mandrel, means for cutting the foils transversely before winding them and carrying the foils to the mandrel on the dielectric members as a conveyor.

In testimony whereof I hereunto affix my signature.

GREENLEAF WHITTIER PICKARD.